US008072887B1

(12) United States Patent
Siva et al.

(10) Patent No.: US 8,072,887 B1
(45) Date of Patent: Dec. 6, 2011

(54) METHODS, SYSTEMS, AND COMPUTER PROGRAM PRODUCTS FOR CONTROLLING ENQUEUING OF PACKETS IN AN AGGREGATED QUEUE INCLUDING A PLURALITY OF VIRTUAL QUEUES USING BACKPRESSURE MESSAGES FROM DOWNSTREAM QUEUES

(75) Inventors: Meera Siva, San Jose, CA (US);
Rajarshi Gupta, San Ramon, CA (US);
Ravi Tangirala, San Jose, CA (US);
Alvin Chee, Sunnyvale, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 733 days.

(21) Appl. No.: 11/052,380

(22) Filed: Feb. 7, 2005

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04L 1/00 | (2006.01) |
| H04L 12/28 | (2006.01) |
| H04L 12/56 | (2006.01) |

(52) U.S. Cl. .......................... 370/236; 370/231; 370/413
(58) Field of Classification Search .................. 370/229, 370/231, 236, 446, 465, 412, 413, 414; 709/232, 709/235, 238
See application file for complete search history.

(56) References Cited

U.S. PATENT DOCUMENTS

| | | | | |
|---|---|---|---|---|
| 5,673,254 | A | | 9/1997 | Crayford ........................ 370/231 |
| 5,838,922 | A | * | 11/1998 | Galand et al. .................. 709/232 |
| 5,987,008 | A | * | 11/1999 | Simpson et al. ............... 370/236 |
| 6,002,675 | A | * | 12/1999 | Ben-Michael et al. ........ 370/315 |
| 6,026,075 | A | * | 2/2000 | Linville et al. ................ 370/236 |
| 6,091,709 | A | | 7/2000 | Harrison et al. |
| 6,097,705 | A | * | 8/2000 | Ben-Michael et al. ........ 370/315 |
| 6,163,528 | A | * | 12/2000 | Nagamoto ..................... 370/236 |
| 6,370,115 | B1 | * | 4/2002 | Smith ............................ 370/230 |
| 6,442,170 | B1 | * | 8/2002 | Perlman et al. ................ 370/401 |
| 6,532,234 | B1 | * | 3/2003 | Yoshikawa et al. ......... 370/395.4 |
| 6,560,230 | B1 | * | 5/2003 | Li et al. ..................... 370/395.42 |
| 6,614,756 | B1 | * | 9/2003 | Morgenstern et al. ........ 370/230 |
| RE38,309 | E | * | 11/2003 | Frazier et al. ................. 370/231 |
| 6,687,247 | B1 | | 2/2004 | Wilford et al. |

(Continued)

FOREIGN PATENT DOCUMENTS

WO   WO 03/039052 A2  *  5/2003

OTHER PUBLICATIONS

Notice of Allowance and Fee(s) Due for U.S. Appl. No. 10/980,503 (May 26, 2010).

(Continued)

*Primary Examiner* — Ayaz Sheikh
*Assistant Examiner* — Hoang-Chuong Vu
(74) *Attorney, Agent, or Firm* — Jenkins, Wilson, Taylor & Hunt, P.A.

(57) ABSTRACT

Methods, systems, and computer program products for controlling enqueuing of packets in an aggregated queue including a plurality of virtual queues are disclosed. According to one method, packets are received at the input side of a queuing system. Each packet is classified into a virtual queue corresponding to one of a plurality of output queues. The output queue sends backpressure messages to the enqueue controller. The enqueue controller determines whether to place the packets in the aggregated queue based on the backpressure messages.

27 Claims, 2 Drawing Sheets

U.S. PATENT DOCUMENTS

| | | | |
|---|---|---|---|
| 6,687,254 B1 * | 2/2004 | Ho et al. | 370/412 |
| 6,721,273 B1 * | 4/2004 | Lyon | 370/235 |
| 6,760,309 B1 | 7/2004 | Rochberger et al. | |
| 6,771,601 B1 | 8/2004 | Aydemir et al. | |
| 6,813,274 B1 * | 11/2004 | Suzuki et al. | 370/412 |
| 6,859,435 B1 * | 2/2005 | Lee et al. | 370/231 |
| 6,987,732 B2 * | 1/2006 | Gracon et al. | 370/235.1 |
| 7,002,980 B1 * | 2/2006 | Brewer et al. | 370/414 |
| 7,023,841 B2 * | 4/2006 | Dell et al. | 370/388 |
| 7,023,857 B1 * | 4/2006 | Chiussi et al. | 370/395.4 |
| 7,031,330 B1 * | 4/2006 | Bianchini, Jr. | 370/412 |
| 7,042,883 B2 * | 5/2006 | Fan et al. | 370/395.4 |
| 7,046,665 B1 * | 5/2006 | Walrand et al. | 370/392 |
| 7,068,602 B2 * | 6/2006 | Davari et al. | 370/232 |
| 7,088,710 B1 * | 8/2006 | Johnson et al. | 370/357 |
| 7,092,387 B2 * | 8/2006 | Chen et al. | 370/360 |
| 7,120,117 B1 * | 10/2006 | Liu et al. | 370/236 |
| 7,145,868 B2 * | 12/2006 | Giroux et al. | 370/229 |
| 7,151,744 B2 * | 12/2006 | Sarkinen et al. | 370/230 |
| 7,161,906 B2 * | 1/2007 | Dell et al. | 370/231 |
| 7,310,339 B1 | 12/2007 | Powers et al. | |
| 7,426,185 B1 * | 9/2008 | Musacchio et al. | 370/235.1 |
| 7,724,754 B2 * | 5/2010 | Kapoor et al. | 370/412 |
| 7,813,348 B1 | 10/2010 | Gupta et al. | |
| 2001/0021174 A1 * | 9/2001 | Luijten et al. | 370/229 |
| 2001/0050913 A1 * | 12/2001 | Chen et al. | 370/360 |
| 2002/0110134 A1 * | 8/2002 | Gracon et al. | 370/412 |
| 2002/0122428 A1 * | 9/2002 | Fan et al. | 370/395.4 |
| 2002/0141427 A1 * | 10/2002 | McAlpine | 370/413 |
| 2003/0021230 A1 * | 1/2003 | Kuo et al. | 370/230 |
| 2003/0058880 A1 * | 3/2003 | Sarkinen et al. | 370/413 |
| 2003/0099193 A1 * | 5/2003 | Liu et al. | 370/229 |
| 2003/0119556 A1 | 6/2003 | Khan et al. | |
| 2003/0174652 A1 | 9/2003 | Ebata | |
| 2004/0128401 A1 * | 7/2004 | Fallon et al. | 709/250 |
| 2004/0196859 A1 * | 10/2004 | Benner | 370/413 |
| 2005/0094645 A1 | 5/2005 | Sridhar et al. | |
| 2005/0157728 A1 * | 7/2005 | Kawano et al. | 370/395.21 |
| 2005/0175014 A1 * | 8/2005 | Patrick | 370/395.43 |
| 2006/0039374 A1 * | 2/2006 | Belz et al. | 370/389 |
| 2006/0092837 A1 * | 5/2006 | Kwan et al. | 370/229 |
| 2006/0101140 A1 * | 5/2006 | Gai et al. | 709/224 |
| 2006/0120286 A1 * | 6/2006 | Fan et al. | 370/230.1 |
| 2006/0164979 A1 * | 7/2006 | Pirbhai et al. | 370/229 |
| 2006/0164989 A1 * | 7/2006 | Hart et al. | 370/235 |
| 2006/0251067 A1 * | 11/2006 | DeSanti et al. | 370/389 |
| 2007/0183421 A1 * | 8/2007 | Terrell et al. | 370/389 |
| 2007/0189283 A1 * | 8/2007 | Agarwal et al. | 370/388 |
| 2007/0237074 A1 * | 10/2007 | Curry | 370/229 |
| 2007/0291755 A1 * | 12/2007 | Cheng et al. | 370/390 |

OTHER PUBLICATIONS

Supplemental Notice of Allowability for U.S. Appl. No. 10/980,503 (Apr. 23, 2010).

Notice of Allowance and Fee(s) Due for U.S. Appl. No. 10/980,503 (Feb. 22, 2010).

Interview Summary for U.S. Appl. No. 10/980,503 (Oct. 26, 2009).

Official Action for U.S. Appl. No. 10/980,503 (Sep. 15, 2009).

Notice of Panel Decision from Pre-Appeal Brief Review for U.S. Appl. No. 10/980,503 (Jul. 20, 2009).

Final Official Action for U.S. Appl. No. 10/980,503 (Jan. 21, 2009).

Official Action for U.S. Appl. No. 10/980,503 (Jun. 26, 2008).

* cited by examiner

METHODS, SYSTEMS, AND COMPUTER PROGRAM PRODUCTS FOR CONTROLLING ENQUEUING OF PACKETS IN AN AGGREGATED QUEUE INCLUDING A PLURALITY OF VIRTUAL QUEUES USING BACKPRESSURE MESSAGES FROM DOWNSTREAM QUEUES

TECHNICAL FIELD

The subject matter described herein relates to controlling enqueuing of packets in a queuing system that uses virtual queues. More particularly, the subject matter described herein relates to methods, systems, and computer program products for controlling enqueuing of packets in an aggregated queue including a plurality of virtual queues using backpressure messages from downstream queues.

BACKGROUND ART

In some queuing systems, multiple input queues or an aggregated input queue with multiple virtual queues feeds multiple output queues. For example, in a network environment, network switches, routers, and various other network devices may include one or more aggregated input queues that serve a number of output queues. The aggregated queues on the input side may be divided into virtual queues that correspond to the output queues. When a packet arrives at the input side of the device, the packet may be classified to one of the virtual queues and stored in the aggregated queue. Information may be stored along with the packet that identifies the virtual queue to which it belongs. A scheduler schedules packets from the head of the aggregated queue, and the packets are forwarded the appropriate output queues.

In order to control flow between the input and output queues, backpressure messages may be sent from the output queues to the scheduler in response to congestion at one or more of the output queues. For example, a backpressure message may be sent from output queue O1 to the scheduler. Output queue O1 may correspond to virtual queue V1 at the sender. Because the scheduler only schedules packets from the head of the aggregated queue without regard to the virtual queues within the aggregated queue, the congestion at output queue O1 may prevent scheduling of packets not only from virtual queue V1, but also from other virtual queues that are not associated with the congested output queue. Some of these virtual queues at the sender may correspond to output queues that are not congested. Accordingly, because congestion from one output queue may affect scheduling of virtual queues whose output queues are not congested, this conventional use of backpressure messages to control scheduling between input and output queues is inefficient.

One potential solution to this problem is to maintain equal numbers of input and output queues and to separately schedule each output queue. However, there may be hundreds or even thousands of input queues. As a result, hundreds or thousands of individual schedulers would be required, resulting in an overly complex queuing system design.

Another problem associated with allowing a packet to be placed in an aggregated queue on the input side when the packet cannot be scheduled due to congestion at the output queue for that packet is that enqueue bandwidth on the input side is wasted.

Accordingly, in light of these difficulties associated with conventional queuing systems, there exists a need for improved methods, systems, and computer program products for controlling the enqueuing of packets in virtual queues using backpressure messages from output queues corresponding to the virtual queues.

SUMMARY

According to one aspect, the subject matter described herein comprises methods, system, and computer program products for controlling enqueuing packets in an aggregated queue including a plurality of virtual queues using backpressure messages from downstream queues corresponding to the virtual queues. One method includes receiving a plurality of packets for queuing in a plurality of different virtual queues corresponding to a plurality of flows. The plurality of packets can include a first packet belonging to a first flow of the plurality of flows. The plurality of virtual queues can include a first virtual queue for queuing packets of the first flow. The method can also include determining a congestion level of the first flow. Further, the method can include preventing the first packet from being enqueued in the first virtual queue in response to the congestion level of the first flow having a predetermined relationship with respect to a threshold level.

As used herein, the term "flow" refers to a plurality of packets that are associated with the same input/output queue combination. For example, a flow may be a group of Ethernet frames traversing a switch that belong to the same TCP connection.

As used herein, the term "virtual queue" refers to a logical queue maintained within a physical queue. The term "aggregated queue" refers to a physical queue that contains one or more virtual queues. Packets may be identified with a virtual queue within an aggregated queue using bits stored along with each packet. The bits may be assigned by a packet classifier that classifies the packets prior to placing the packets in the virtual queue. These bits may be used by the scheduler of the aggregated queue to determine the appropriate output queue to which each packet should be forwarded. However, in order to keep the scheduling algorithm simple, these bits are preferably not used to perform independent scheduling for each virtual queue. The scheduler for the aggregated queue may schedule packets from the head of the aggregated queue without regard to the virtual queue to which the packets belong. As a result, without the methods and systems described herein, congestion at one output queue could adversely affect scheduling of flows destined for other output queues. However, because the methods and systems described herein use backpressure information to limit enqueuing of packets destined for congested output queues, the effect of such congestion is reduced.

BRIEF DESCRIPTION OF THE DRAWINGS

Preferred embodiments of the subject matter described herein will now be explained with reference to the accompanying drawings of which.

DETAILED DESCRIPTION

Methods, systems, and computer program products for controlling enqueuing of packets using backpressure messages from downstream queues according to embodiments of the subject matter described herein may be implemented in any suitable device that includes a set of queues that feeds another set of queues. For example, the methods, systems, and computer program products may be implemented in a packet forwarding device, such as an Ethernet switch or an IP router. In one exemplary implementation, the subject matter described herein may be implemented as a computer program product comprising computer-executable instructions embodied in a computer readable medium accessible by a packet forwarding device. Exemplary computer-readable media suitable for implementing the subject matter described herein include chip memory devices, optical disks, magnetic disks, application-specific integrated circuits, programmable logic devices, or any other medium capable of storing computer-executable instructions.

The subject matter described herein can prevent or reduce the effect of congestion of one output queue on virtual input queues that are not associated with the congested output queue. In one exemplary implementation, the subject matter described herein includes using backpressure messages from output queues to determine whether to enqueue a packet in an aggregated input queue including a plurality of virtual queues. In response to determining that an output queue to which a particular packet is destined is congested, the packet may be discarded or otherwise prevented from being enqueued in the aggregated queue on the input side. Because packets destined for congested output queues are not enqueued in the aggregated input queue, the likelihood that a packet at the head of the aggregated input queue will block packets from other virtual queues is reduced. In addition, enqueue bandwidth on the input side is conserved.

Figure 1:
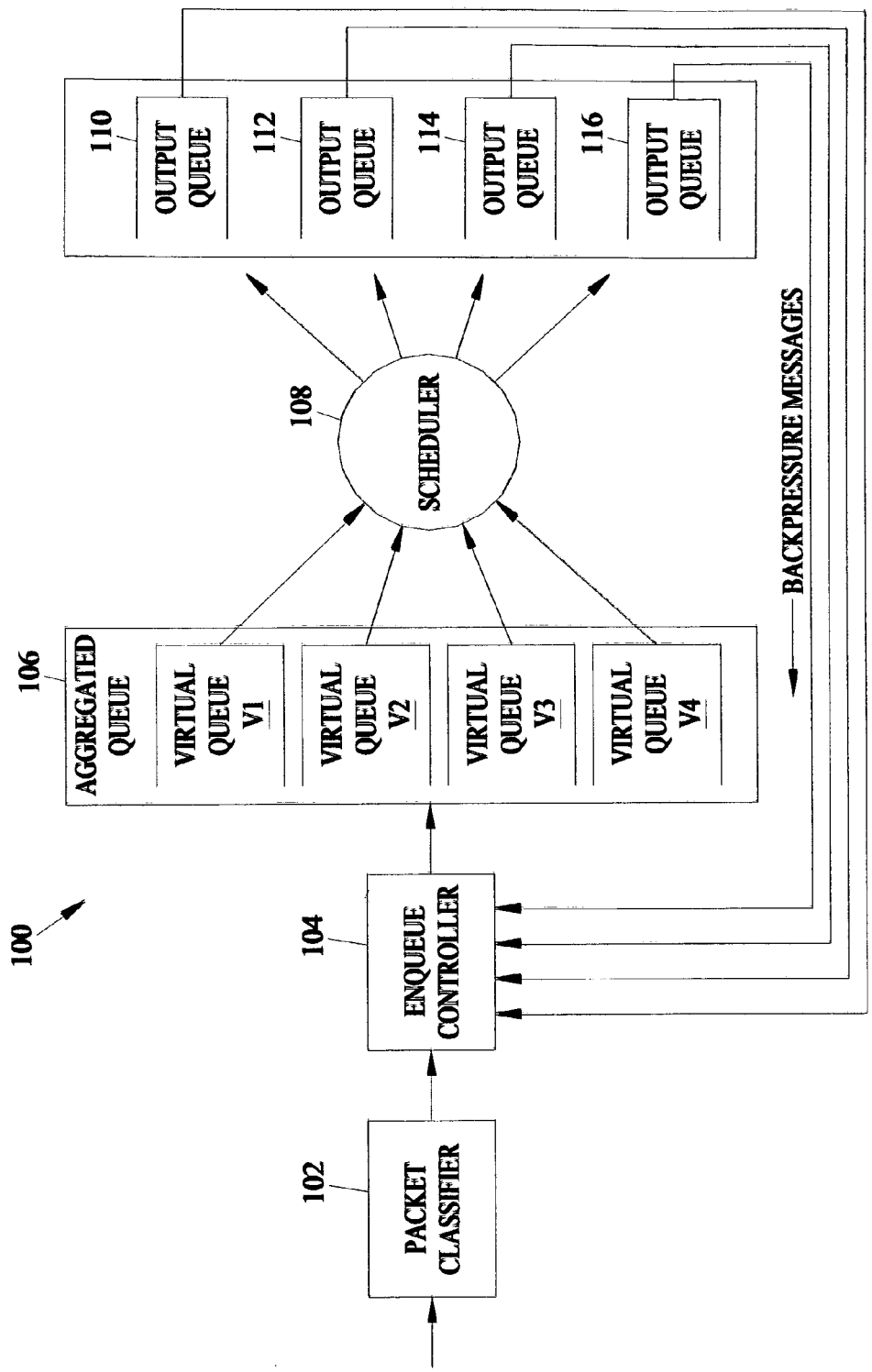
FIG. 1 is an exemplary packet queuing system for controlling enqueuing of packets using backpressure messages from downstream queues according to an embodiment of the subject matter described herein.

FIG. 1 illustrates an exemplary packet queuing system, generally designated 100, for controlling enqueuing of packets in multiple virtual queues contained within an aggregated queue according to an embodiment of the subject matter described herein. Referring to FIG. 1, system 100 includes a packet classifier 102, an enqueue controller 104, an aggregated queue 106 containing virtual queues V1-V4, a scheduler 108, and a plurality of output queues 110, 112, 114, and 116. System 100 may also include additional aggregated queues, output queues, and schedulers that are not shown in order to simplify FIG. 1. These additional components can manage the classification and forwarding of received packets to downstream flows similar to the methods described herein with respect to components 102-116.

Packet classifier 102 may classify received packets to a virtual queue and a corresponding output queue. For example, packet classifier 102 may classify a packet to an output queue depending on the flow or connection with which the packet is associated. Packet classifier 102 may write bits in a predetermined field of each packet that identifies the flow, the output queue, and/or the virtual queue on the input side. The output queue may correspond to the flow, and the virtual queue may correspond to the output queue. Accordingly, a single identifier may be used to identify the flow, output queue, and virtual queue. After classifying the packet and adding the appropriate virtual queue, output queue, or flow identification bits, rather than passing the packet to aggregated queue 106 as in conventional systems, packet classifier 102 may forward the packet to enqueue controller 104.

Enqueue controller 104 determines whether or not to enqueue each packet in aggregated queue 106 based on backpressure messages received from output queues 110, 112, 114, and 116. If enqueue controller 104 determines that a particular packet should be enqueued, the packet is forwarded to aggregated queue 106. If enqueue controller 104 determines that a particular packet should not be enqueued, the packet may be discarded. In one exemplary implementation, enqueue controller 104 can discard a packet when the congestion level of an output queue to which a particular packet is destined reaches or exceeds a threshold congestion level. Because the packet is discarded before being enqueued, congestion at the output queue will not affect other packets destined for different output queues. In addition, because packets for congested output queues are not enqueued on the input side, enqueue bandwidth is conserved.

In the illustrated example, aggregated queue 106 includes virtual queues V1-V4 corresponding to output queues 110, 112, 114, and 116. The number of virtual queues on the input side may be set according to the number of output queues or downstream flows. For example, a system with 1000 output queues or flows may include 1000 virtual queues on the input side. Although virtual queues V1-V4 are illustrated as separate queues in FIG. 1, packets may be placed and scheduled in aggregated queue 106 in a FIFO manner. That is, packets may be stored in linked lists in aggregated queue 106 in the order in which they are received. Thus, packets in different virtual queues may be intermixed with each other and may be scheduled without regard to the virtual queue with which they belong.

Scheduler 108 schedules packets stored in aggregated queue 106. The scheduling algorithm implemented by scheduler 108 may be a FIFO scheduling algorithm whereby the head-of-line packet in aggregated queue 106 is forwarded to an appropriate output queue based on the output queue identified in the packet. Scheduler 108 may receive backpressure messages from output queues 110, 112, 114, and 116 and prevent a head-of-line packet from being forwarded to a congested output queue until the congestion falls below a threshold level. This can result in head-of-line blocking. However, because the enqueuing of packets destined for congested output queues is controlled, the likelihood of such blocking is reduced.

When the head-of-line packet is removed from aggregated queue 106, the next packet in aggregated queue 106 becomes the new head-of-line packet and the remaining packets move up in the same order behind the new head-of-line packet. Such a scheduling algorithm is simple, and, as a result, queue scheduling time is reduced. This simple scheduling algorithm combined with the enqueue control mechanisms described herein makes queuing system 100 more efficient.

Output queues 110, 112, 114, and 116 store packets until they can be forwarded to a downstream device. The downstream device may be another memory within a packet forwarding device or a separate packet forwarding device. A scheduler on the output side (not shown in FIG. 1) may control the forwarding of packets to the downstream device. When packets in a particular queue cannot be scheduled on the output side due to congestion at the downstream device, the output queue may begin to fill with packets. In one exemplary implementation, once the output queue uses a threshold percentage of the memory allocated to the output queue, the output queue may generate a backpressure message and forward the backpressure message to enqueue controller 104.

Enqueue controller 104 may use the backpressure message to control enqueuing of packets in aggregated queue 106. For example, any of output queues 110, 112, 114, and 116 can become full if the corresponding output port is congested. Output queues 110, 112, 114, and 116 can transmit backpressure messages to enqueue controller 104 for indicating a congestion level or other suitable measure of the congestion. The congestion information contained in a backpressure message may be used to determine whether a packet will be discarded rather than being enqueued in aggregated queue 106. If the congestion level of an output queue has a predetermined relationship with respect to a threshold level, packets destined for the output queue can be discarded by virtual queue enqueue controller 104. Otherwise, the packet can be enqueued in aggregated queue 106 and subsequently forwarded to the output queues. Thus, a packet can be discarded if the downstream packet flow corresponding to the packet has a congestion level with a predetermined relationship with respect to a threshold level. For example, if the output queue has a congestion level that is greater than or equal to a threshold level, the packet may be discarded. By discarding packets rather than enqueuing the packets in aggregated queue 106, the likelihood that backpressure from one output queue will adversely affect a virtual queue that does not correspond to the congested output queue is reduced over systems where backpressure messages are used to control scheduling packets at the head of the input queues. Even in such systems, backpressure-controlled enqueuing, as described herein, may be used in combination with backpressure-controlled scheduling. Thus, the methods and systems described herein for controlling enqueuing of packets using backpressure messages may be used in queuing systems both with and without backpressure-controlled scheduling from the head of the input queue(s).

Various criteria can be utilized for determining whether a congestion level for a packet flow has the predetermined relationship with respect to the threshold level. According to one embodiment, a congestion level of a flow can be determined by measuring the available memory in an output queue associated with the flow. Available memory for the output queue can indicate the severity of the congestion for the flow. The available memory can be compared to a threshold to determine whether packets should be discarded by virtual queue enqueue controller 104.

As stated above, queuing system 100 can be implemented in a packet forwarding device including hardware and software for forwarding packets to other devices. In one exemplary implementation, queuing system 100 may be implemented in an Ethernet switch. An exemplary Ethernet switch including an underlying hardware platform suitable for use with embodiments described herein is the BLACKDIAMOND™ Ethernet switch or any of the other switches available from Extreme Networks, Inc. of Santa Clara, Calif. Queuing system 100 can be implemented in the packet forwarding device with any suitable combination of software, hardware, and/or firmware. However, the methods and systems described herein are not limited to controlling enqueuing of packets in a packet forwarding device. The methods and systems described herein for controlling the enqueuing of packets in virtual queues of an aggregated queue may be applied to any queuing system having multiple output queues and in which virtual queues are used to identify packets corresponding to the output queues. The methods and systems described herein may be used to mitigate the effects of congestion in systems where the number of output queues is greater than the number of input queues, equal to the number of input queues, or less than the number of input queues.

In one example, a system may have five input aggregated queues I1-I5, each having four virtual input queues serving four output queues O1-O4. The virtual input queues in each aggregated input queue may be labeled Vxy, where x corresponds to the aggregated queue number, and y corresponds to the output queue corresponding to the virtual queue. Thus, input queue I1 would include virtual queues V11, V12, V13, and V14, where virtual queues V11, V12, V13, and V14 respectively enqueue packets for output queues O1-O4. Similarly, input queue I2 would include virtual queues V21, V22, V23, and V24, respectively enqueuing packets for output queues O1-O4. The remaining input queues would also be configured in this manner. When congestion occurred at one of the output queues, for example, O3, without the methods and systems described herein, all of the input queues could potentially be affected. Using the methods and systems described herein, only V13, V23, V33, V43, and V53, rather than all of the virtual queues, would be affected. Thus, the methods and systems described herein are an improvement over conventional queuing systems.

Figure 2:
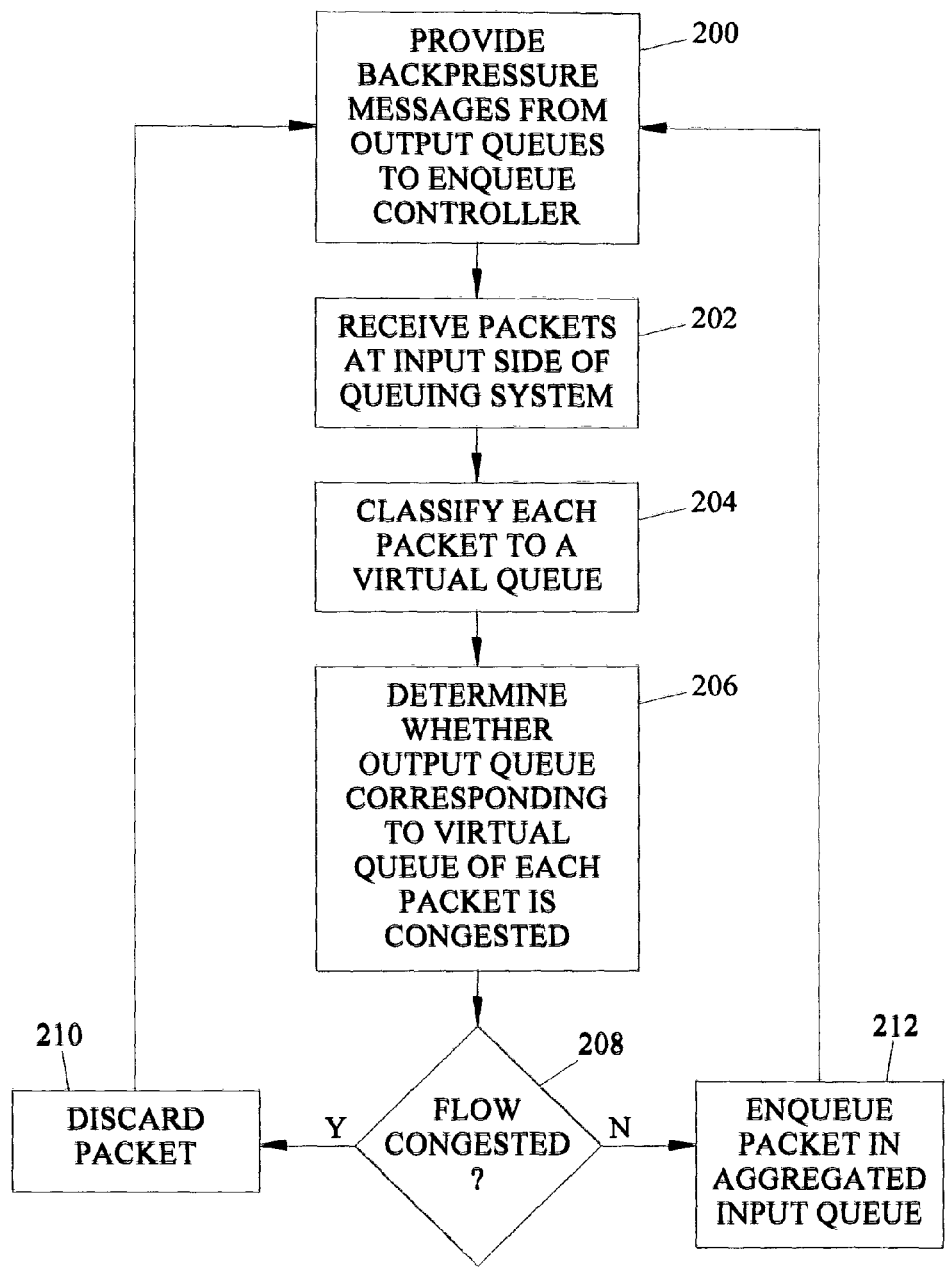
FIG. 2 is a flow chart illustrating an exemplary process for controlling enqueuing of packets using backpressure messages from downstream queues corresponding to the virtual queues according to an embodiment of the subject matter described herein.

FIG. 2 is a flow chart illustrating exemplary steps for controlling enqueuing of packets in an aggregated queue including a plurality of virtual queues using backpressure information according to an embodiment of the subject matter described herein. Referring to FIG. 2, in step 200, backpressure messages are provided from an output queue to enqueue controller 104. In step 202, packets are received at the input side of a queuing system. In step 204, packets are classified to a virtual queue corresponding to one of the output queues. In steps 206 and 208, it is determined whether the output queue or flow corresponding to the virtual queue of each packet is congested. If the output queue or flow is congested, control proceeds to step 210 where the packet is discarded instead of being placed in the aggregated queue. If the flow is not congested, control proceeds to step 212 where the packet is enqueued in the aggregated queue.

By controlling enqueuing of packets based on congestion information received from output queues, the likelihood that congestion in one of the output queues will affect flows that are not destined for that output queue is reduced. As a result, enqueuing bandwidth on the input side is conserved and overall queuing system efficiency is increased.

As described herein, the congestion level measured for a flow corresponding to a virtual queue can be based upon the congestion level of an output queue receiving packets in the flow. The congestion level can be compared to a threshold level for determining whether to discard packets associated with the output queue. According to one embodiment, a packet can be discarded if the available memory in an associated output queue is less than a predetermined amount of memory space. Packets may be discarded at a location upstream from a virtual queue when the congestion level measured downstream from the virtual queue exceeds a predetermined level or threshold.

According to one refinement of the methods and system described herein, the threshold level for each of the flows can be set differently for different downstream flows. Thus, the packets in some flows may be dropped more readily than others depending on the threshold level for the packets' flow. In one exemplary implementation, the threshold congestion level for each flow may be set based on the priority of the flow. For example, it may not be desirable to drop packets of high priority. In this case, the threshold congestion level for the high priority flow may be set higher than that of low priority flows so that packets from the high priority flow will be discarded less readily than those of the low priority flows.

According to another refinement of the methods and systems described herein, the threshold congestion level may be set differently for a flow depending on the amount of memory allocated for the output queue for the flow. For example, the threshold congestion level may be set lower for flows with lower output queue memory allocations to avoid packet overflow at any of the output queues. This will reduce dropping of overflow packets for the queue and will improve efficiency by preserving output queuing bandwidth.

In yet another refinement of the methods and systems described herein, a variation of random early detection (RED) can be used to control discarding of packets on the input side. In this refinement, packets corresponding to a flow may be randomly discarded at the enqueue processor before the virtual input queue when a congestion level for the flow measured downstream from the virtual input queue for the flow exceeds a predetermined level or threshold. The rate of randomly discarding packets can increase as the congestion level increases for the flow in order to more quickly reduce the packet flow burden on the congested output queue.

Thus, as described above, the subject matter described herein includes methods, systems, and computer program products for controlling enqueuing of packets of different flows in a queuing system having a plurality of virtual queues corresponding to the different flows. A method according to one embodiment can include receiving a plurality of packets for queuing in a plurality of different virtual queues corresponding to a plurality of flows. The plurality of packets can include a first packet belonging to a first flow of the plurality of flows. The plurality of virtual queues can include a first virtual queue for queuing packets of the first flow. The method can also include determining a congestion level of the first flow. Further, the method can include discarding the first packet in response to the congestion level of the first flow having a predetermined relationship with respect to a threshold level. As a result, backpressure on other virtual queues in the same aggregated queue as the first virtual queue can be reduced or prevented.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for controlling enqueuing of packets in an aggregated physical queue including a plurality of virtual queues using backpressure information, the method comprising:
   at a packet classifier:
      receiving a plurality of packets corresponding to a plurality of flows for enqueuing in a plurality of virtual queues, the plurality of packets including a first packet belonging to a flow of the plurality of flows;
      classifying the first packet to an output queue and a corresponding virtual queue based on the flow to which the first packet belongs; and
      writing a plurality of bits to a predetermined field of the first packet, wherein the bits identify the flow to which the first packet belongs, the output queue to which the first packet is classified, and the corresponding virtual queue to which the first packet is classified; and
   at an enqueue controller located upstream from the aggregated physical queue including the plurality of virtual queues being logical queues maintained within the aggregated physical queue and corresponding to a plurality of output queues located downstream from the aggregated physical queue and a scheduler, wherein the scheduler schedules packets from the head of the aggregated physical queue without regard to the virtual queues to which the packets are classified and wherein the scheduler is configured to identify the output queue to which the first packet is classified based on the bits written to the predetermined field of the first packet:
      receiving the plurality of packets from the packet classifier;
      receiving feedback from one of the output queues and determining, based on the feedback, a congestion level of the flow to which the first packet belongs; and
      preventing the first packet from being enqueued in the aggregated physical queue in response to the congestion level of the flow to which the first packet belongs having a predetermined relationship with respect to a threshold level.

2. The method of claim 1 wherein receiving the plurality of packets includes receiving a plurality of packets destined for the plurality of output queues corresponding the plurality of flows.

3. The method of claim 1 wherein determining the congestion level of the flow to which the first packet belongs comprises determining memory space available in the output queue to which the first packet is classified.

4. The method of claim 3 wherein preventing the first packet from being enqueued comprises comparing the memory space available to a memory space threshold.

5. The method of claim 4 comprising discarding the first packet if the memory space available is less than the memory space threshold.

6. The method of claim 1 comprising randomly discarding packets associated with the flow to which the first packet belongs in response to the congestion level of the flow to which the first packet belongs having the predetermined relationship with respect to the threshold level.

7. The method of claim 6 comprising:
   determining the difference between the congestion level of the flow to which the first packet belongs and the threshold level; and
   randomly discarding packets at a rate based on the determined difference between the congestion level of the flow to which the first packet belongs and the threshold level.

8. The method of claim 1 comprising determining congestion levels for each of the flows downstream from the aggregated physical queue.

9. The method of claim 8 comprising discarding packets associated with one of the flows in response to the congestion level of the one of the flows having a predetermined relationship with respect to a threshold congestion level for the one packet flow.

10. The method of claim 9 wherein at least some of the flows have different threshold congestion levels.

11. The method of claim 10 wherein the threshold congestion levels are set based on flow priority.

12. A queuing system for controlling enqueuing of packets, the system comprising:
   a packet classifier for receiving a plurality of packets corresponding to a plurality of flows for enqueuing in a plurality of virtual queues, the plurality of packets including a first packet belonging to a flow of the plurality of flows, for classifying the first packet to an output queue and a corresponding virtual queue based on the flow to which the first packet belongs, and for writing a plurality of bits to a predetermined field of the first packet, wherein the bits identify the flow to which the first packet belongs, the output queue to which the first packet is classified, and the corresponding virtual queue to which the first packet is classified;
   an aggregated physical queue including the plurality of virtual queues being logical queues maintained within the aggregated physical queue and corresponding to the plurality of flows;

a plurality of output queues located downstream from the aggregated physical queue for receiving packets from the virtual queues;

a scheduler located between the aggregated queue and the output queues for scheduling the packets from the head of the aggregated physical queue without regard to the virtual queues to which the packets are classified and forwarding the packets to the plurality of output queues, wherein the scheduler is configured to identify the output queue to which the first packet is classified based on the bits written to the predetermined field of the first packet; and an enqueue controller positioned upstream from the aggregated physical queue for receiving the plurality of packets from the packet classifier, for receiving feedback from one of the output queues, for determining, based on the feedback, a congestion level of the flow to which the first packet belongs, and for preventing the first packet from being enqueued in the aggregated physical queue in response to the congestion level of the flow to which the first packet belongs having a predetermined relationship with respect to a threshold level.

13. The system of claim 12 wherein the output queues are operable to determine memory space available for each output queue and to communicate a corresponding congestion level to the enqueue controller.

14. The system of claim 13 wherein the enqueue controller is operable to compare the congestion level for each output queue to a threshold level for that queue.

15. The system of claim 14 wherein the enqueue controller is operable to discard a packet if the congestion level is greater than the threshold level.

16. The system of claim 12 wherein the enqueue controller is operable to randomly discard packets associated with the flow to which the first packet belongs in response to the congestion level of the flow to which the first packet belongs having the predetermined relationship with respect to the threshold level.

17. The system of claim 16 wherein the enqueue controller is operable to randomly discard packets at a rate based on the difference between the congestion level of the flow to which the first packet belongs and the threshold level.

18. A non-transitory computer readable medium comprising computer readable instructions stored thereon to be executed on a processor, the instructions comprising program code for performing steps comprising:

at a packet classifier:
receiving a plurality of packets corresponding to a plurality of flows for enqueuing in a plurality of virtual queues, the plurality of packets including a first packet belonging to a flow of the plurality of flows;

classifying the first packet to an output queue and a corresponding virtual queue based on the flow to which the first packet belongs; and writing a plurality of bits to a predetermined field of the first packet, wherein the bits identify the flow to which the first packet belongs, the output queue to which the first packet is classified, and the corresponding virtual queue to which the first packet is classified; and at an enqueue controller located upstream from an aggregated physical queue including the plurality of virtual queues being logical queues maintained within the aggregated physical queue and corresponding to a plurality of output queues located downstream from the aggregated physical queue and a scheduler, wherein the scheduler schedules packets from the head of the aggregated physical queue without regard to the virtual queues to which the packets are classified and wherein the scheduler is configured to identify the output queue to which the first packet is classified based on the bits written to the predetermined field of the first packet:

receiving the plurality of packets from the packet classifier;

receiving feedback from one of the output queues and determining, based on the feedback, a congestion level of the flow to which the first packet belongs; and preventing the first packet from being enqueued in the aggregated physical queue in response to the congestion level of the flow to which the first packet belongs having a predetermined relationship with respect to a threshold level.

19. The non-transitory computer readable medium of claim 18 wherein determining the congestion level of the flow to which the first packet belongs comprises determining memory space available for an output queue positioned downstream from the aggregated physical queue and associated with the flow to which the packet belongs.

20. The non-transitory computer readable medium of claim 19 wherein preventing the first packet from being enqueued comprises comparing the memory space available to a memory space threshold.

21. The non-transitory computer readable medium of claim 20 comprising discarding the first packet if the memory space available is less than the memory space threshold.

22. The non-transitory computer readable medium of claim 18 comprising randomly discarding packets associated with the flow to which the first packet belongs in response to the congestion level of the flow to which the first packet belongs having the predetermined relationship with respect to the threshold level.

23. The non-transitory computer readable medium of claim 22 comprising:
determining the difference between the congestion level of the flow to which the first packet belongs and the threshold level; and randomly discarding packets at a rate based on the determined difference between the congestion level of the flow to which the first packet belongs and the threshold level.

24. The non-transitory computer readable medium of claim 18 comprising determining congestion levels for each of the flows downstream from the aggregated physical queue.

25. The non-transitory computer readable medium of claim 24 comprising discarding packets associated with one of the flows in response to the congestion level of the one of the packet flows having a predetermined relationship with respect to a threshold congestion level for the one packet flow.

26. The non-transitory computer readable medium of claim 25 wherein at least some of the flows have different threshold congestion levels.

27. The non-transitory computer readable medium of claim 26 wherein the threshold congestion levels are set based on flow priority.

* * * * *